Jan. 8, 1957 L. E. LEGG 2,777,042
MEANS FOR CLEARING CARBON GROUNDS
Filed Nov. 13, 1952
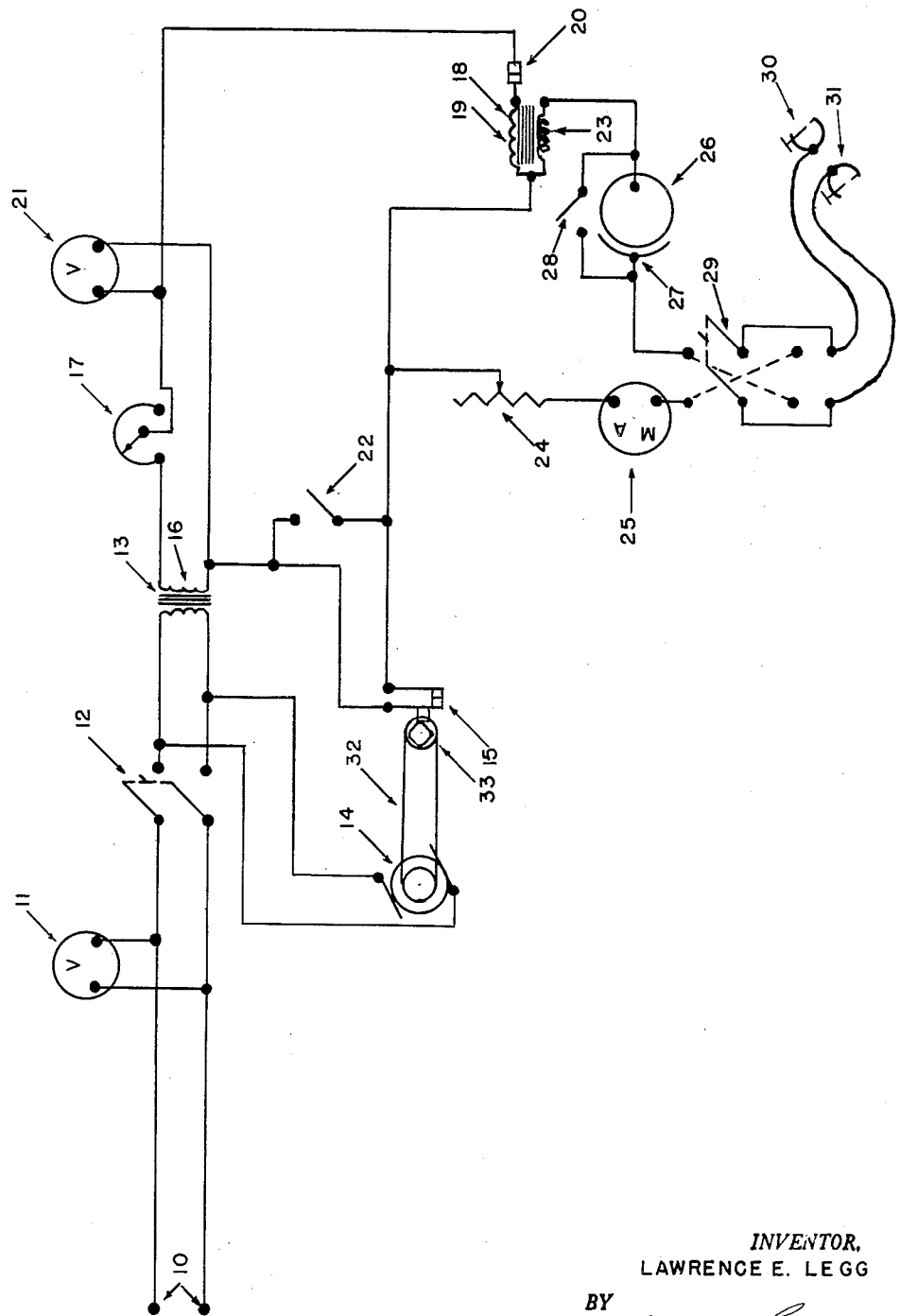
INVENTOR,
LAWRENCE E. LEGG
BY
*Wilson T. Seppert*
*Atty's.*

United States Patent Office 2,777,042
Patented Jan. 8, 1957

2,777,042

MEANS FOR CLEARING CARBON GROUNDS

Lawrence E. Legg, Chicago, Ill.

Application November 13, 1952, Serial No. 320,185

4 Claims. (Cl. 219—19)

The present invention relates to a novel means and manner of removing carbon deposits which may form between the windings and pole pieces or frames of electrical equipment such as generators, motors, and the like, in which the carbonized collected particles cause grounding of the windings and result in rendering such electrical equipment or apparatus inoperative.

For example, in the operation of direct current generators such as those employed with diesel locomotives, the field coils or armatures are frequently grounded due to the collection of dirt, leaves, carbon dust and other foreign matter about the portion of the apparatus carrying high voltage. These collected particles being generally a conductor of electricity, continue to build up about a point where the insulation is weak or has deteriorated until such time when current leakage to the ground or frame of the locomotive results. This current flow or leakage carbonizes the deposited foreign matter which then forms a ready conductor for the electrical current. When this occurs and leakage of a predetermined strength takes place, the ground relay on the locomotive trips and the power plant of the locomotive is automatically shut down and cannot be used until the ground is cleared.

Due to the physical construction of most generators, motors and other electrical equipment, and their mounting in more or less inaccessible locations, the accumulated dirt and other collected foreign particles cannot be readily or effectively blown away or removed and they continue to accumulate until they provide a carbon deposit. In the operation and servicing of diesel-powered locomotives, when such a ground occurs in the main generators they must be changed out at a cost of several thousand dollars, and this is in addition to holding the locomotive out of service for several days.

Thus, it will be appreciated that the clearing of carbon grounds in order to maintain operative generators, motors and the like, presents a serious maintenance problem particularly with respect to diesel locomotives the cost of which is tremendous.

It is, therefore, an object of the present invention to clear such electrical equipment of grounds without the necessity of securing direct access to the grounded parts or physical or manual removal of the accumulated carbonaceous matter collected on such parts of the electrical equipment carrying high voltage.

The present invention further comprehends the provision of a novel method and manner of clearing carbonaceous deposits from electrical equipment whereby to prevent grounding of such equipment.

Further objects are to provide a construction of maximum simplicity, efficiency, economy and ease of assembly and operation, and such further objects, advantages and capabilities as will later more fully appear and are inherently possessed thereby.

In the drawing is diagrammatically disclosed an illustrative embodiment of a novel means and manner of clearing carbon grounds from electrical equipment by the burning and disintegration of the carbon that may form between the windings and pole pieces or frame of generators, motors and other electrical equipment, and which carbon, if retained, renders the equipment inoperative or ineffective for its intended purpose.

The novel invention comprehends the application of an available 110 volt alternating current supply line to the terminals at 10 of the system or circuit, the voltage of which is visually indicated to the operator by an A. C. voltmeter 11. This supply line is connected through a suitable switch 12 for energizing or deenergizing a step-down transformer 13 and a motor 14. Operation of the motor opens and closes breaker points 15 by means of a suitable belt drive 32 and an actuating cam 33.

The secondary winding 16 of the transformer 13 steps down the potential to a relatively low value which may be approximately six to eight volts and which value may be readily adjusted by means of a rheostat 17. This secondary winding energizes the primary winding 18 of an induction coil 19 through a vibrator or suitable breaker points 20 and this secondary voltage may be indicated by an A. C. voltmeter 21. A switch 22 is provided and shown in open position in the circuit. When closed, this switch shunts the current about the breaker points 15.

The voltage or potential induced into the secondary winding 23 of the induction coil 19 will be of relatively high value, approximately 10,000 volts, but with the current or amperage inversely low. A potentiometer 24 may be employed to adjust the current flowing in the circuit external to the secondary winding 23 of the induction coil 19, and which current is indicated upon an A. C. milliammeter 25. A gas envelope or tube 26 and plate 27 provided in the circuit may be circumvented by closing of a switch 28, when desired. The gas envelope 26 and plate 27 function somewhat in the nature of a plate condenser which is alternately charged and discharged incident to the application of pulsating voltage thereto. This has been found effective in the disintegration of the carbon in some instances. In those instances where it is found to be ineffective, the switch 28 is closed and thereby circumventing or by-passing the gas filled envelope 26. A polarity switch 29 is provided and may be thrown either way to reverse the instantaneous pulsations. Vibrator or breaker points 20 may be tightly closed when it is desired to employ the breaker points 15 controlling the breaker frequency.

By connecting terminal clamps 30 and 31 to the electrical equipment requiring the removal of carbon deposits, with one of these terminals connected to the ground or frame of such equipment and the other to the windings thereof, collected or accumulated carbon thereon is caused to burn and disintegrate and then disappear, and thereby remove the carbon ground through the manipulation or operation of the switches, rheostats and breaker points.

Although the above description and the disclosure in the drawing refers to a preferred embodiment of the present invention, a source of direct current supply may be employed for the operation of the induction coil 19, and a step-up transformer employed in lieu of the combination of the step-down transformer 13 and the induction coil 19. Furthermore, other means for greatly increasing the potential or voltage to the desired value while reducing the current or amperage flow to an inversely low value, may be provided. In either event, the current is of such a small value that no harmful effects result to the insulation of the generator, motor or electrical equipment being cleared of the collected carbonaceous matter resulting in grounding of the equipment.

In order to follow the progress being made in clearing the carbon ground, I preferably provide a milliammeter 25 in the high voltage circuit which indicates the presence of carbon requiring removal and the effectiveness of such removal. It will be appreciated that the heavier the carbon deposit, the higher will be the reading of the milliammeter, and as this carbon burns the disintegrates the reading diminishes. For example, by inserting a milliammeter, having a range of readings of approximately 0 to 100 milliamperes, in the high voltage circuit with the terminal clamps 30 and 31 connected as above described, a short circuit reading taken before commencing the burning or removal process, will generally show a reading of a maximum of approximately 80 milliamperes. This reading is followed by an open circuit reading which is generally approximately 5 milliamperes, depending somewhat upon surrounding conditions, such as humidity. The operator can then readily recognize when the resistance between the windings and ground is increasing and the carbon is removed, when the present apparatus may be disconnected for megger readings.

In the operation of the device and assuming the terminal clamps or members 30 and 31 are connected one to the ground or frame of the equipment to be cleared and the other to the circuit leading to the winding thereof, and with the switches 28 and 22 open, switch 12 is closed to energize the motor 14 and the induction coil 19. The rheotsat 17 is adjusted to give approximately 6 volts as shown on the voltmeter 21, and the potentiometer 24 is adjusted to give a predetermined reading on the scale of the milliammeter 25. Switch 29 is then closed to either position. If reading on milliammeter 25 is decreasing, then the operator is assured that progress is being made in clearing the ground. But, if no decrease is observed, then the polarity switch 29 is thrown to the opposite position.

If no progress is made as shown by a reduction in the reading on the milliammeter by the use of an interrupted current, then the switch 22 is closed to by-pass the breaker points 15 and permit the breaker points or vibrator 20 to control the frequency of the pulsations. If there is no decrease in the reading on the milliammeter 25 in one position of the polarity switch 29, the latter is moved to its other position. Then if nothing happens as shown by the reading of the milliammeter 25, switch 22 is opened and switch 28 is closed to by-pass the gas tube 26 and thereby permit the application of a stronger current supply.

If at any time there is a definite reduction in the current reading as shown by the milliammeter 25, thereafter the switch 12 is opened to deenergize the complete circuit of the present apparatus and the switch 29 is opened to isolate the circuit of the grounded equipment and a megger reading is taken across the open blades of the switch 29 to give the dialectric strength of the insulation on the winding of the grounded equipment.

If it is found that none of the above circuit arrangements clears the ground, an increase in current value to the clamps 30 and 31 may be required. This may be readily accomplished by adjusting potentiometer 24 to its maximum reading, and the same may be done with the rheostat 17.

Although it will be clearly evident that the present invention is not intended to reestablish the insulation, it does permit the operation of the equipment until its periodic period of service or its periodic change-out is to be effected. Thus it will permit power units of diesel locomotives to operate satisfactorily for a predetermined period or until such period of change-over is reached, rather than require it to be withdrawn from service prior to its intended change-out.

Having thus disclosed the invention, I claim:

1. Mechanism for removing carbon grounds from the windings of electrical equipment such as generators, motors and the like in which such ground renders the equipment ineffective or inoperative, comprising an electric circuit adapted to be connected to a source of alternating current supply, a pair of terminals connected in the circuit with one terminal connected to the winding affected and the other connected to the frame of the affected equipment, means in said circuit for supplying a high potential pulsating current to the terminals for removing the carbon grounding said winding and including a continuous, alternating current supply, breaker points for interrupting the alternating current supply, a motor and motor-actuated cam for automatically opening and closing the breaker points in timed relation for supplying the terminals with a high potential pulsating current, and means in said circuit for visually indicating the progress being made in effecting removal of the carbon.

2. Mechanism for the disintegration of carbon formed between the windings and the pole pieces or frame of electrical equipment such as generators, comprising an electrical circuit adapted to be connected to a source of current supply, terminals connected to said circuit one of which is adapted to be connected to the winding affected and the other to the frame of the equipment, and means in said circuit for supplying to the terminals a high voltage pulsating current for removing the carbon grounding said winding including a continuous current supply, breaker points for interrupting the current supply, and means for automatically opening and closing the breaker points in timed relation to supply high voltage pulsating current to the terminals.

3. Mechanism for the disintegration of carbon formed between the windings and the pole pieces or frame of an electrical generator, comprising an electrical circuit adapted to be connected to a source of alternating current supply, terminals connected in the circuit one of which is adapted to be clamped to the winding affected and the other to the frame of the generator, means in said circuit for supplying to the terminals a high voltage pulsating current for removing the carbon grounding said winding including a continuous current supply, breaker points for interrupting the current supply, and means for automatically opening and closing the breaker points in timed relation to supply high voltage pulsating current to the terminals, and means in said circuit for varying the intensity of the pulsating current to assure effective disintegration of the carbon.

4. Mechanism for the disintegration of carbon formed between the windings and the pole pieces or frame of an electrical generator, comprising an electrical circuit adapted to be connected to a source of alternating current supply, terminals connected in the circuit one of which is adapted to be clamped to the winding affected and the other to the frame of the generator, means in said circuit for supplying to the terminals a high voltage pulsating current for removing the carbon grounding said winding including a continuous, alternating current supply and rotatable means for automatically interrupting the current supply at predetermined time intervals to supply the terminals with a high voltage pulsating current, means in said circuit for varying the intensity of the pulsating current to assure effective disintegration of the carbon, and a double-throw polarity switch adapted to reverse the pulsations supplied to the affected winding.

References Cited in the file of this patent

UNITED STATES PATENTS

| | | |
|---|---|---|
| 1,824,341 | Gill | Sept. 22, 1931 |
| 1,906,030 | Whelchel | Apr. 25, 1933 |
| 2,108,637 | Bartgis | Feb. 15, 1938 |
| 2,494,029 | Bertalaw et al. | Jan. 10, 1950 |
| 2,593,131 | Foust et al. | Apr. 15, 1952 |